(12) United States Patent
Ying et al.

(10) Patent No.: US 10,374,504 B2
(45) Date of Patent: Aug. 6, 2019

(54) POWER UNIT AND POWER ELECTRONIC CONVERTING DEVICE

(71) Applicant: Delta Electronics (Shanghai) CO., LTD, Shanghai (CN)

(72) Inventors: Jianping Ying, Shanghai (CN); Ming Wang, Shanghai (CN); Xiaobo Huang, Shanghai (CN); Jun Liu, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 0 days.

(21) Appl. No.: 15/708,323

(22) Filed: Sep. 19, 2017

(65) Prior Publication Data

US 2018/0175719 A1    Jun. 21, 2018

(30) Foreign Application Priority Data

Dec. 16, 2016 (CN) .......................... 2016 1 1170857
Dec. 21, 2016 (CN) .......................... 2016 1 1191912

(51) Int. Cl.
*H02M 1/00* (2006.01)
*H02M 7/483* (2007.01)

(52) U.S. Cl.
CPC ............. *H02M 1/00* (2013.01); *H02M 7/483* (2013.01); *H02M 2001/007* (2013.01); *H02M 2007/4835* (2013.01)

(58) Field of Classification Search
CPC ... H02M 2001/0067; H02M 2001/007; H02M 2001/0077; H02M 2001/0003
See application file for complete search history.

(56) References Cited

U.S. PATENT DOCUMENTS 7,705,705 B2    4/2010    Zeng et al.
8,686,746 B2    4/2014    Zhou et al.
(Continued)

FOREIGN PATENT DOCUMENTS

CN    101917126 A    12/2010
CN    102148579 A     8/2011
(Continued)

OTHER PUBLICATIONS

The International Search Report issued in the counterpart PCT application No. PCT/CN2017/116351 dated Mar. 6, 2018, by the SIPO as the ISA.
(Continued)

*Primary Examiner* — Jeffrey A Gblende
*Assistant Examiner* — Lakaisha Jackson
(74) *Attorney, Agent, or Firm* — Yunling Ren

(57) ABSTRACT

A power unit includes: a plurality of power converters, a first output terminal of one of two adjacent power converters among the plurality of power converters is connected successively to a second output terminal of the other one of the two adjacent power converters; a local controller configured to output a plurality of control signals; and a plurality of driving circuits configured to output driving signals according to the plurality of control signals, to drive the plurality of power semiconductor switches to be turned on and off, wherein the control signals corresponding to the power semiconductor switches in the same position of the plurality of power converters are the same, the power semiconductor switches in the same position of the plurality of power converters are simultaneously turned on and off.

15 Claims, 12 Drawing Sheets

(56) References Cited

U.S. PATENT DOCUMENTS

| | | |
|---|---|---|
| 2005/0237010 A1 | 10/2005 | Ying et al. |
| 2008/0218320 A1 | 9/2008 | Jang |
| 2009/0268496 A1 | 10/2009 | Tan et al. |
| 2012/0091977 A1 | 4/2012 | Carroll et al. |
| 2013/0148390 A1* | 6/2013 | Na .................. H02M 7/487 363/40 |
| 2013/0223115 A1 | 8/2013 | Tsuchiya et al. |
| 2013/0229838 A1* | 9/2013 | Wang .................. H02M 7/493 363/40 |
| 2014/0015322 A1* | 1/2014 | Milavec .................. H02J 1/10 307/52 |
| 2015/0340890 A1 | 11/2015 | Yao et al. |
| 2016/0072395 A1* | 3/2016 | Deboy .............. H02M 3/33592 363/21.1 |
| 2016/0277071 A1* | 9/2016 | Dzung .................. H04B 3/56 |
| 2017/0029242 A1* | 2/2017 | Agirman .................. B66B 1/302 |
| 2017/0033703 A1* | 2/2017 | Kikuchi ............ H02M 3/33592 |

FOREIGN PATENT DOCUMENTS

| | | |
|---|---|---|
| CN | 102611345 A | 7/2012 |
| CN | 202616988 U | 12/2012 |
| CN | 103280952 A | 9/2013 |
| CN | 103546024 A | 1/2014 |
| CN | 203522498 U | 4/2014 |
| CN | 104410101 A | 3/2015 |
| CN | 204967648 U | 1/2016 |
| CN | 105356770 A | 2/2016 |
| CN | 105391313 A | 3/2016 |
| CN | 105406705 A | 3/2016 |
| CN | 105453405 A | 3/2016 |
| CN | 206332626 U | 7/2017 |
| EP | 2595302 A1 | 5/2013 |
| TW | 265484 B | 12/1995 |
| TW | 201218604 A | 5/2012 |
| TW | 201306470 A | 2/2013 |
| TW | 201528666 A | 7/2015 |
| TW | 201633691 A | 9/2016 |
| WO | 2012028640 A2 | 3/2012 |

OTHER PUBLICATIONS

The Taiwanese 1OA No. 106144106 issued by TIPO dated Aug. 6, 2018.
The Taiwanese 1OA No. 106144105 issued by TIPO dated Aug. 3, 2018.
The Taiwanese 1OA No. 106144104 issued by TIPO dated Aug. 3, 2018.
The International Search Report issued in the counterpart PCT application No. PCT/CN2017/116352 dated Mar. 15, 2018, by the SIPO as the ISA.
The International Search Report issued in the counterpart PCT application No. PCT/CN2017/116353 dated Mar. 21, 2018, by the SIPO as the ISA.
The International Search Report issued in the counterpart PCT application No. PCT/CN2017/116354 dated Mar. 16, 2018, by the SIPO as the ISA.
First Office Action for Chinese Patent Application No. 2017113227943 dated Mar. 29, 2019.
The US1OA dated Jun. 29, 2018 by the USPTO.

* cited by examiner

US 10,374,504 B2

POWER UNIT AND POWER ELECTRONIC CONVERTING DEVICE

CROSS REFERENCE

This application claims priority to Chinese Patent Application No. 201611170857.3, filed on Dec. 16, 2016, and Chinese Patent Application No. 201611191912.7, filed on Dec. 21, 2016, the entire contents thereof are incorporated herein by reference.

TECHNICAL FIELD

The present disclosure relates to the field of power electronic technology, in particular to a power unit and a power conversion device using the power unit.

BACKGROUND

As being restricted by a voltage level of a power electronic switching element, it is generally a preferred choice of applying a cascade topology in which power units are connected in series, in a high voltage and high power application. Generally, in the cascade topology, each power unit is provided with an optical fiber, an auxiliary power supply, and a control panel. As the voltage level increases, the number of the power units that need to be cascaded increases, resulting in a sharp increase in the number of the optical fiber, the auxiliary power supply and the control panel. The structure design of the cascade topology may be complex and costly, and the reliability of the system may be reduced.

SUMMARY

According to one aspect, the present disclosure provides a power unit including:

a plurality of power converters, each power converter including at least one bridge leg having a plurality of power semiconductor switches, and each power converter including a first output terminal and a second output terminal, wherein the first output terminal of one of two adjacent power converters among the plurality of power converters is connected successively to the second output terminal of the other one of the two adjacent power converters, and the residual first output terminal and the second output terminal are configured as a first terminal and a second terminal of the power unit;

a local controller configured to output a plurality of control signals; and a plurality of driving circuits coupled to the local controller and configured to receive the plurality of control signals and output respective driving signals according to the plurality of control signals, to drive the plurality of power semiconductor switches to be turned on and off, wherein the plurality of power converters are the same, a number of the plurality of control signals is the same as a number of the power semiconductor switches in each power converter, and the control signals corresponding to the power semiconductor switches in the same position of the plurality of power converters are the same, such that the power semiconductor switches in the same position of the plurality of power converters are simultaneously turned on and off.

According to another aspect, the present disclosure provides a power electronic conversion device including:

a main controller, configured to output a main control signal; and at least one power unit according to the previous embodiments, wherein the local controller is coupled to the main controller to receive the main control signal and correspondingly generate the control signals.

BRIEF DESCRIPTION OF THE DRAWINGS

The foregoing and other objects, features and advantages of the present disclosure will become more apparent from the following description of exemplary embodiments thereof with reference to the accompanying drawings.

DETAILED DESCRIPTION

Figure 1:
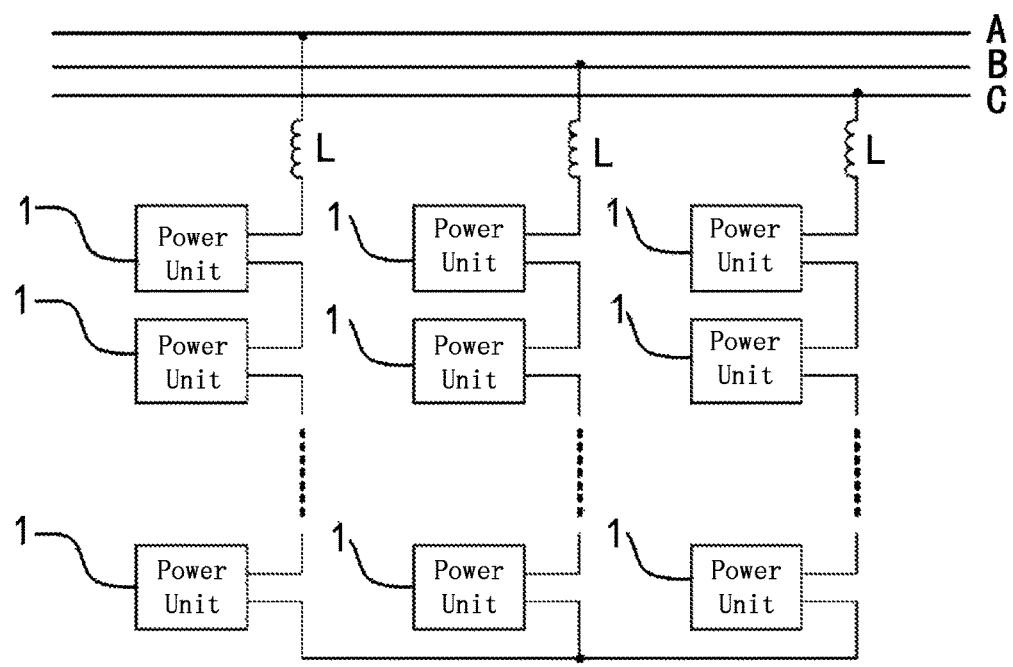
FIG. 1 is a schematic view of a general static var generator (SVG) according to a comparative embodiment of the present disclosure.

Example embodiments will now be described more fully with reference to the accompanying drawings. However, example embodiments may be embodied in many forms and should not be construed as limited to the examples set forth herein; rather, these embodiments are provided such that the disclosure are more through and complete, and will fully convey the concepts of example embodiments to those skilled in the art. The drawings are merely illustrative of the present disclosure and are not necessarily to be drawn to scale. The same reference numerals in the drawings denote the same or similar parts, and thus repeated description thereof will be omitted.

In addition, the features, structures or characteristics described herein can be combined in one or more embodiments in any appropriate way. In the description hereinafter, many specific details are provided for fully understanding of the embodiments of the present disclosure. However, it will be appreciated by those skilled in the art that the technical solution of the present disclosure can be practiced without one or more of the specific details, or with other methods, components, devices or steps, etc. In addition, known structures, methods, devices, implementations or operations will not be illustrated or described in detail, to avoid obscuration of the aspects of the present disclosure.

Figure 2:
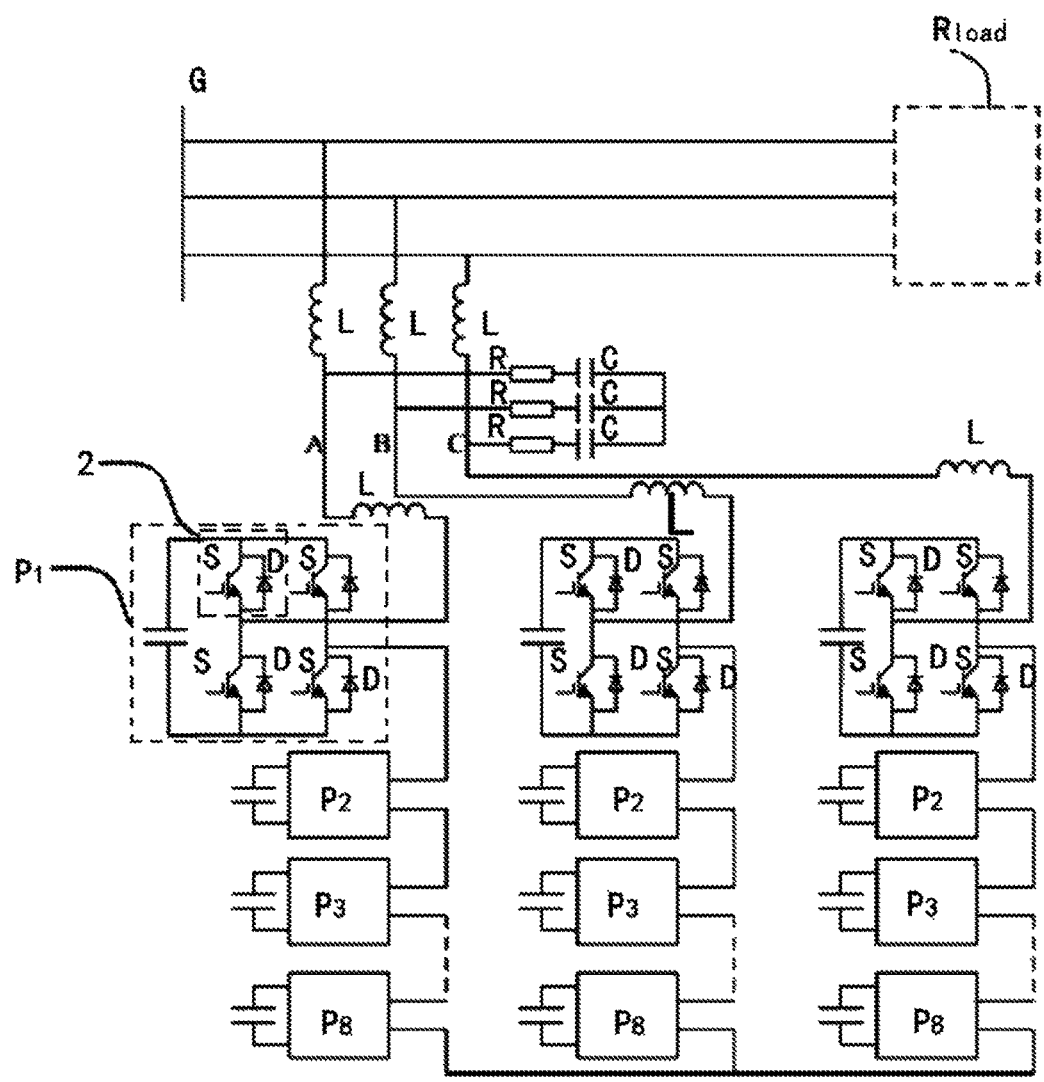
FIG. 2 is a schematic view in further detail of a general SVG according to a comparative embodiment of the present disclosure.

FIGS. 1 and 2 are schematic views of a general static var generator (SVG) according to a comparative embodiment of the present disclosure. The SVG includes a three-phase circuit, and the power units in each phase circuit are connected in cascade.

As shown in FIG. 1, each phase circuit of the SVG is cascaded by a plurality of power units 1, wherein each power unit includes a first terminal and a second terminal. The first terminal of the first power unit of each phase circuit is connected to each of the three-phase lines A, B and C of a three-phase power grid through a filter L respectively. The second terminal of one of two adjacent power units is connected to the first terminal of the other one, and the second terminals of the last power units in each phase circuit are connected to each other.

As shown in FIG. 2, each phase circuit of the SVG is cascaded by eight power units P1 to P8, each of which includes a first terminal and a second terminal, wherein the second terminal of one of the two adjacent power units is connected to the first terminal of the other one. For example, the second terminal of the power unit P1 is connected to the first terminal of the power unit P2, the second terminal of the power unit P2 is connected to the first terminal of the power unit P3, and the second terminal of the power unit P7 is connected to the first terminal of the power unit P8. The first terminals of the three power units P1 in the three-phase circuit are connected via a filter circuit (consisting of an inductor, a resistor and a capacitor, for example, an LCL) to the A, B and C phases of the three-phase grid G respectively and the load $R_{load}$, and the second terminals of the three power units P8 in the three-phase circuit are connected to each other. Each power unit includes four power devices 2, and each of the power devices consists of a power semiconductor switch S and a diode D. A collector of the power semiconductor switch S is connected to a cathode of the diode D, and an emitter of the power semiconductor switch S is connected to an anode of the diode D.

The single-phase SVG also includes a plurality of power units, each of which includes a first terminal and a second terminal, and the first terminal of one of the two adjacent power units is connected to the second terminal of the other one.

Figure 3:
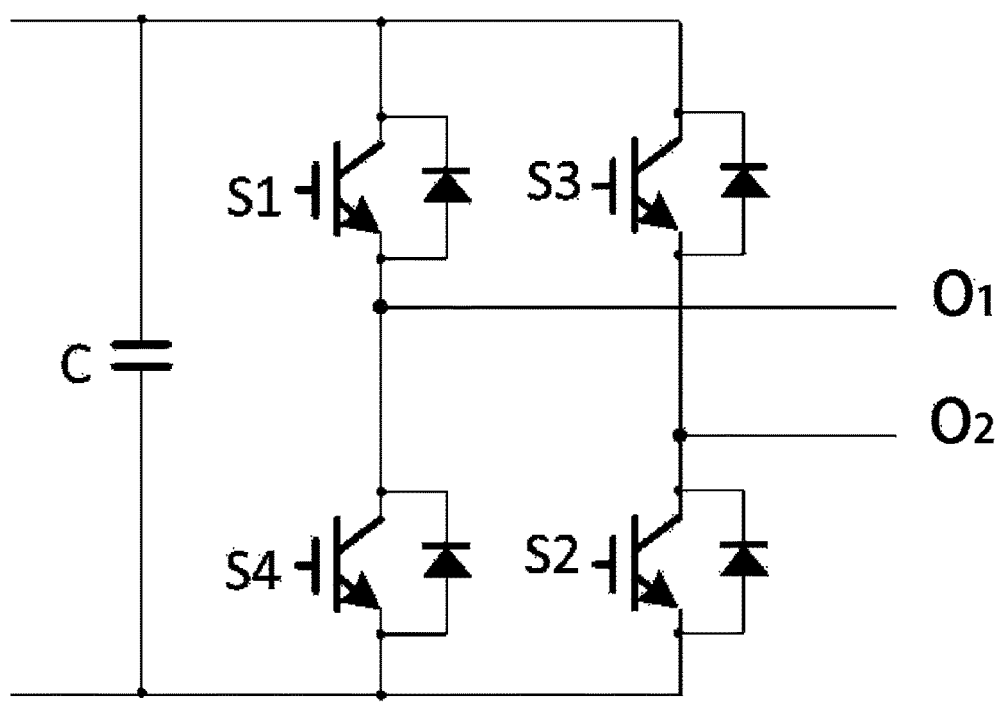
FIG. 3 is a schematic view of an H-bridge circuit.

The power unit 1 shown in FIG. 1 may be an H-bridge circuit or other circuit topology such as a half bridge circuit, a three-level converting circuit, or the like. For example, taking the power unit for the H-bridge circuit as an example, the H-bridge circuit includes power semiconductor switches S1 to S4 and a bus capacitor C, as shown in FIG. 3. A first terminal of the power semiconductor switch S1 is connected to a positive terminal of the bus capacitor C and a first terminal of the power semiconductor switch S3, and a second terminal of the power semiconductor switch S1 is connected to a first terminal of the power semiconductor switch S4. A second terminal of the power semiconductor switch S4 is connected to a negative terminal of the bus capacitor C and a second terminal of the power semiconductor switch S2. A second terminal of the power semiconductor switch S3 is connected to a first terminal of the power semiconductor switch S2. The second terminal of the power semiconductor switch S1 serves as a first output terminal $O_1$ of the H-bridge circuit, and a second terminal of the power semiconductor switch S3 serves as a second output terminal $O_2$ of the H-bridge circuit.

In the case where the above cascade topology of the power unit is applied to a 35 KV wind power plant, there are usually three schemes, which will be described hereinafter in detail.

I) Each power unit uses an H-bridge circuit, and each of the power semiconductor switches S1 to S4 in the H-bridge circuit may use low-voltage power devices such as a low-voltage IGBT (Insulated Gate Bipolar Translator).

Advantages: the low-voltage IGBT (such as 1700V) currently has a relatively more mature process, and is available in larger quantities at an affordable cost; and each power semiconductor switch consists of one IGBT, such that it is unnecessary to consider the voltage balance problem.

Disadvantages: as a single power device has a low voltage (for example, a 1700V IGBT, and the DC bus voltage across the bus capacitor C is about 1000V), each phase circuit needs to use about 72 stages of H-bridge circuits. The number of H-bridge circuits is large and the reliability of the system will be affected. In addition, each H-bridge circuit is provided with a set of optical fibers (optical fibers are usually used in high-voltage applications for signal transmission), an auxiliary power supply and a control panel. Each H-bridge circuit shall be independently controlled. Due to the large number of cascade bridges, this scheme will lead to a large number of optical fiber, auxiliary power supply and control panel, and thus the control and structure of the whole system may become complicated, the cost may increase, and the system reliability may be reduced.

II) Each power unit uses an H-bridge circuit, and each of the power semiconductor switches S1 to S4 in the H-bridge circuit may use high-voltage power devices such as a high-voltage IGBT (Insulated Gate Bipolar Translator).

Advantages: as a single power device bears a high voltage level (for example, a 6500V IGBT), the DC bus voltage across the bus capacitor C is about 3000V, and thus each phase circuit needs to use about 18 stages of H-bridge circuits. The number of cascaded H-bridge circuits is reduced, and meanwhile the quantity of the optical fibers, the auxiliary power supply and the control panel is reduced. Accordingly, corresponding costs may be reduced, system control and structure may be simplified, and meanwhile reliability may be increased.

Disadvantages: the cost of the high-voltage IGBT is much higher than that of the low-voltage IGBT (the 6500V IGBT has a much higher cost (about four times higher) than that of the 1700V IGBT). Accordingly, the cost increased by using the high-voltage IGBT is much higher than the cost reduced by reducing the control panels and the optical fibers, resulting in a substantial increase of the system cost.

III) Each power unit uses an H-bridge circuit, and each of the power semiconductor switches S1 to S4 in the H-bridge circuit can choose low-voltage power devices connected in series.

Advantages: the number of cascaded H-bridge circuits may be reduced. The number of cascaded H-bridge circuits may be the same as that in the second scheme. However, the power semiconductor switches in each H-bridge circuit are connected in series using multiple low-voltage power devices (e.g., four IGBTs of 1700V are connected in series, which may be equivalent to a 6500V IGBT), thereby reducing system costs. Compared with the first scheme, the number of cascaded H-bridge circuits in this scheme is reduced, the number of the optical fiber, the auxiliary power supply and the control panel is also reduced. Accordingly, the cost is reduced, and the control and structure are simplified and the reliability is increased. Compared with the second scheme, the use of multiple low-voltage IGBTs in series which may equivalent to a high-voltage power device may have a lower cost than using a single high-voltage power device. The use of multiple low-voltage power devices in series which may be equivalent to a high-voltage power device is cost-effective.

Disadvantages: a problem of voltage unbalance exists in the series connected low-voltage IGBTs, and a clamping plate is required for each of the low-voltage IGBT to solve this problem, resulting in a large number of clamping plates and reduction of system reliability.

Figure 4:
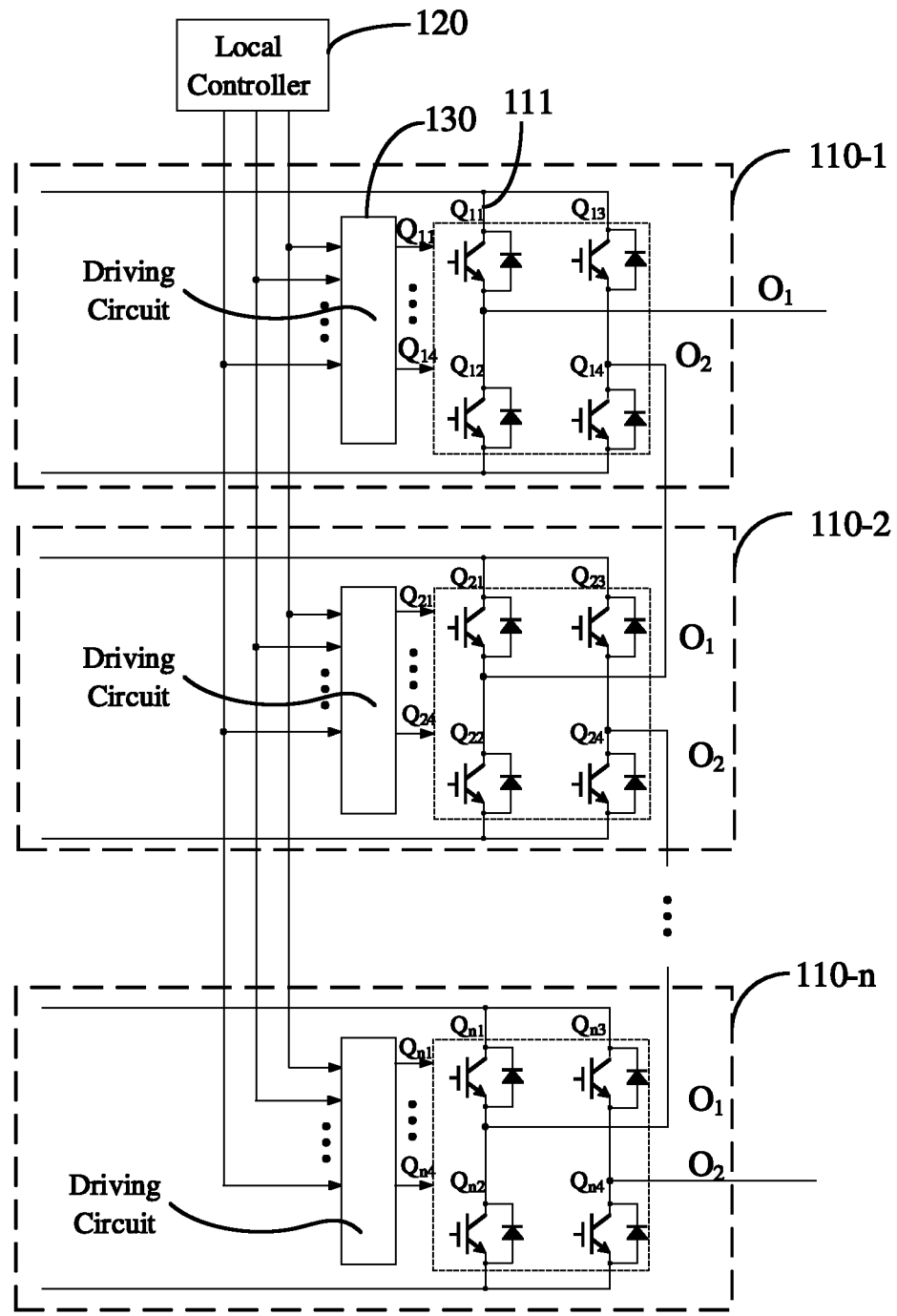
FIG. 4 is a schematic view of a power unit 100 according to an embodiment of the present disclosure.

FIG. 4 illustrates a power unit 100 according to an embodiment of the present disclosure, the power unit 100 includes: a plurality of power converters 110-1, ..., 110-n, a local controller 120 and a plurality of driving circuits 130.

In the embodiment, each power converter 110 includes at least one bridge leg 111 having a plurality of power semiconductor switches (e.g., $Q_{11}$ and $Q_{12}$), and each power converter 110 includes a first output terminal $O_1$ and a second output terminal $O_2$, wherein the first output terminal $O_1$ of one of two adjacent power converters 110 among the plurality of power converters is connected successively to the second output terminal $O_2$ of the other one of the two adjacent power converters, and the residual first output terminal and the second output terminal are configured to from a first terminal (e.g., the first output terminal $O_1$ of the first power converter 110) and a second terminal (e.g., the second output terminal $O_2$ of the last power converter 110-n) of the power unit 100. In particular, a number of the plurality of power converters is "n", the first output terminal $O_1$ of the first power converter 110-1 is configured to be the first terminal of the power unit 100, the second output terminal $O_2$ of the first power converter 110-1 is connected to the first output terminal $O_1$ of the second power converter 110-2, other power converters are connected successively till the (n−1)-th power converter, the second output terminal $O_2$ of the (n−1)-th power converter is connected to the first output terminal $O_1$ of the n-th power converter 110-n, and the second output terminal $O_2$ of the n-th power converter 110-n is configured to be the second terminal of the power unit 100, wherein n is a natural number greater than 1.

A local controller 120 is configured to output a plurality of control signals (not illustrated).

a plurality of driving circuits 130 are coupled to the local controller 120 and configured to receive the plurality of control signals and output respective driving signals according to the plurality of control signals, to drive the power semiconductor switches (e.g., $Q_{11}$, $Q_{12}$, $Q_{13}$, ..., $Q_{n4}$ illustrated in the drawings) to be turned on and off.

As illustrated in FIG. 4, the plurality of power converters are the same, a number of the control signals is the same as a number of the power semiconductor switches in each power converter, and the control signals received by the driving circuit 130 corresponding to the power semiconductor switches in the same position of the plurality of power converters are the same, such that the power semiconductor switches in the same position of the plurality of power converters are simultaneously turned on and off.

In other words, each power unit 100 includes a plurality of the same power converter in which the power semiconductor switch at the same position is controlled by the same control signals. Accordingly, each power switching circuit 110 in each power unit 100 has the same function.

In the embodiment, for example, the power converters 110-1, ..., 110-n are described as H-bridge circuits in FIG. 4, while the power converters 110-1, ..., 110-n according to embodiments of the present disclosure are not limited to H-bridge circuits.

Figure 5:
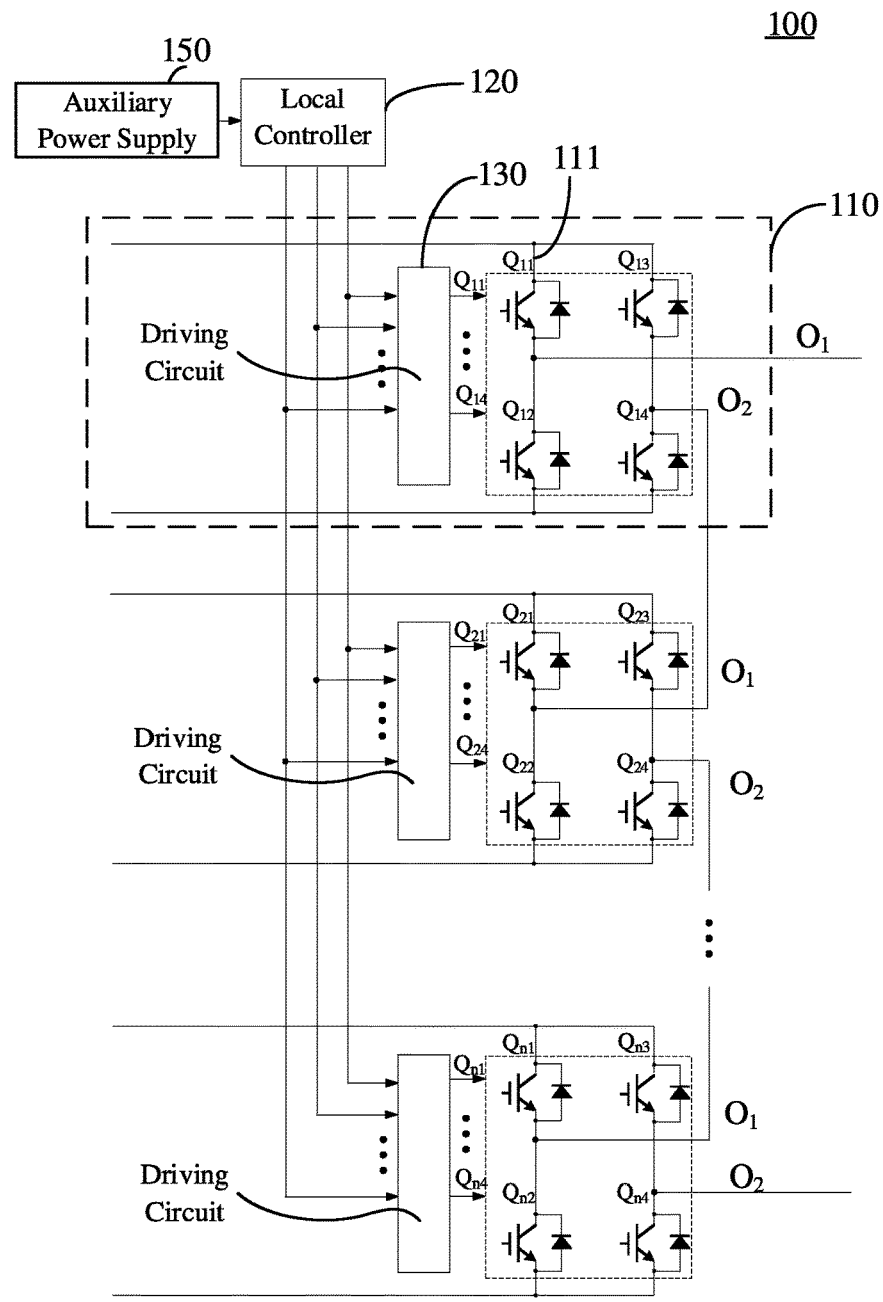
FIG. 5 is a schematic view of a power unit 100 according to another embodiment of the present disclosure.

Further, referring to FIG. 5, in some embodiments, the power unit 100 further includes an auxiliary power supply 150 connected to the local controller 120 and configured to provide power for the local controller 120.

Each power unit 100 requires only one auxiliary power supply 150, accordingly, a number of the auxiliary power supply 150 in the power electronic conversion device using the power unit 100 according to the present embodiment is reduced, thereby saving the cost and simplifying the circuit structure.

In some embodiments, the number of the driving circuit 130 is the same as the number of the power semiconductor switches, and each driving circuit 130 drives a corresponding power semiconductor switch (e.g., $Q_{11}$, $Q_{12}$, $Q_{13}$, ..., $Q_{n4}$ illustrated in the drawings) to be turned on and off.

In other words, each driving circuit 130 is configured to transfer a control signal to a particular power semiconductor switch to control it to turn on and off.

In some embodiments, the plurality of driving circuits 130 are electrically connected to the local controller 120 directly.

In some embodiments, the plurality of driving circuits 130 are connected to the local controller 120 through a magnetic isolation device.

In some embodiments, the plurality of driving circuits 130 are connected to the local controller 120 through an optical isolation device.

The use of magnetic isolation device may have high reliability, high performance and low power loss. The use of optical isolation device may have the advantage of signal unidirectional transmission, full electrical isolation between the input and output terminals, no effect between the input terminal and the output signal, strong anti-interference ability, stabilization, non-contact, long life, and high transmission efficiency.

Figure 6:
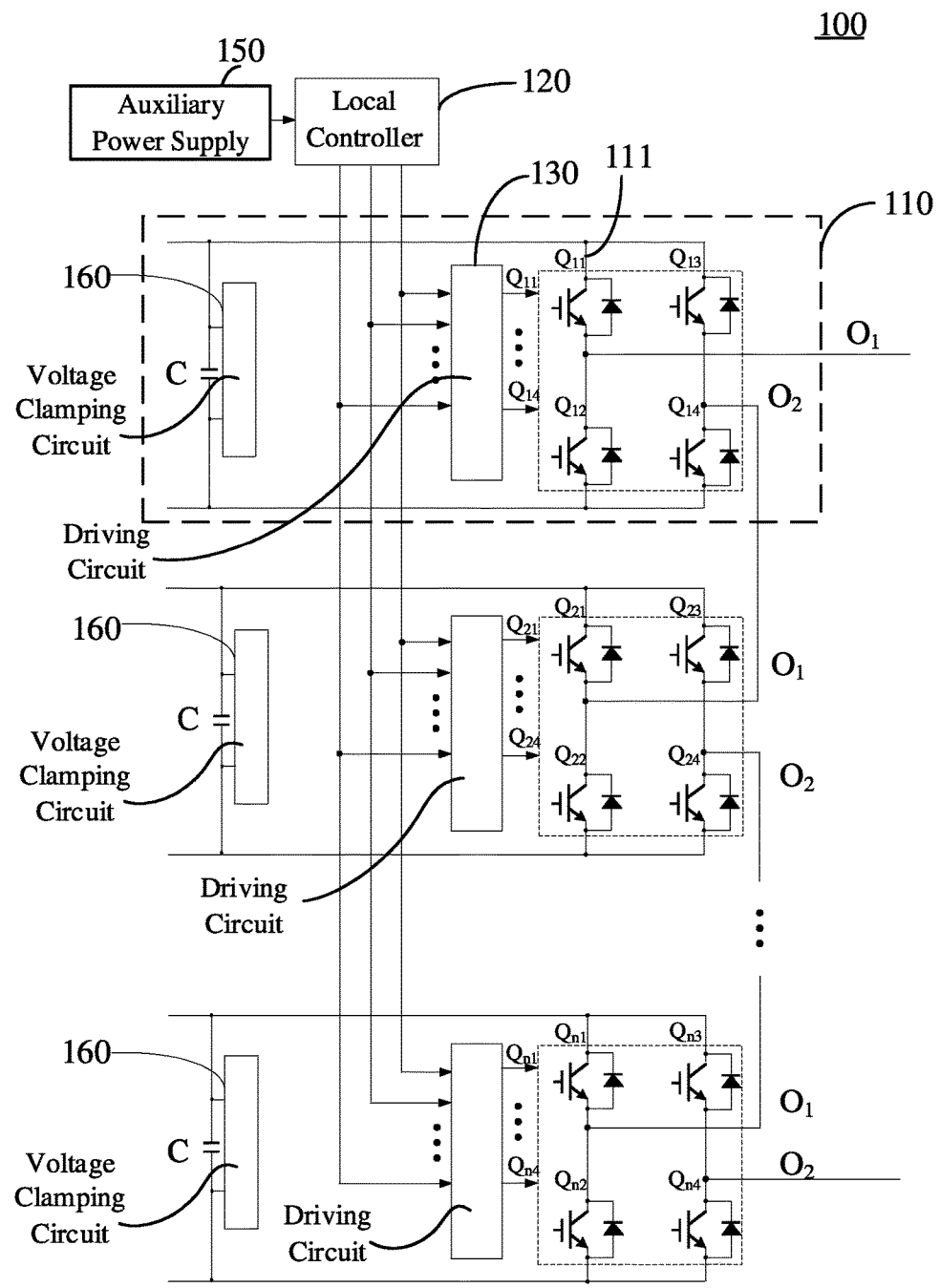
FIG. 6 is a schematic view of a power unit 100 according to another embodiment of the present disclosure.

Further, referring to FIG. 6, in some embodiments, the power converter further includes a bus capacitor C and a voltage clamping circuit 160, both ends of the bus capacitor C are connected in parallel to both ends of the bridge leg 111, and the voltage clamping circuit 160 is connected in parallel to both ends of the bus capacitor C.

In the present embodiment, a DC bus voltage across both ends of the bus capacitor C is clamped by the voltage clamping circuit 160 within a predetermined range. In this embodiment, the predetermined range may be any operating voltage range well known to those skilled in the art, which will not repeat it herein.

In each power unit 100, the first output terminal of one of the adjacent two power converters is connected in series to the second output terminal of the other one, and in order to solve the problem of voltage-sharing, the voltage clamping circuit 160 may be provided at both ends of the bus capacitor C of each power converter. The bus capacitor C is connected in parallel to the voltage clamping circuit 160, and both of which are connected in parallel to both ends of the bridge leg 111. Accordingly, the DC bus voltage across both ends of the bus capacitor C of each power converter is clamped within a predetermined range. Accordingly, no overvoltage may occur in each power converter, which may protect the power semiconductor switch.

In the power unit 100 of the embodiment of the present disclosure, a voltage clamping circuit 160 is required only for both ends of the bus capacitor C of each power converter, and thus it is unnecessary to provide a voltage clamping circuit for every power semiconductor switch, thereby reducing the number of the voltage clamping circuits, reducing cost, simplifying circuit, and improving system reliability.

For convenience of description, it is assumed that in some embodiments, a number of the plurality of power converters is "n", the first output terminal $O_1$ of the first power converter is configured to be the first terminal of the power unit 100, the second output terminal $O_2$ of the first power converter is connected to the first output terminal $O_1$ of the second power converter, other power converters are connected successively till the (n−1)-th power converter, the second output terminal $O_2$ of the (n−1)-th power converter is connected to the first output terminal $O_1$ of the n-th power converter, and the second output terminal $O_2$ of the n-th power converter is configured to be the second terminal of the power unit 100, wherein n is a natural number greater than 1. Generally, n is much larger than 1.

The power converter of the power unit 100 according to embodiments of the present disclosure may employ different topologies, and several different topologies are described as alternative embodiments hereinafter. However, the present disclosure is not limited to the following listed topologies.

Figure 7:
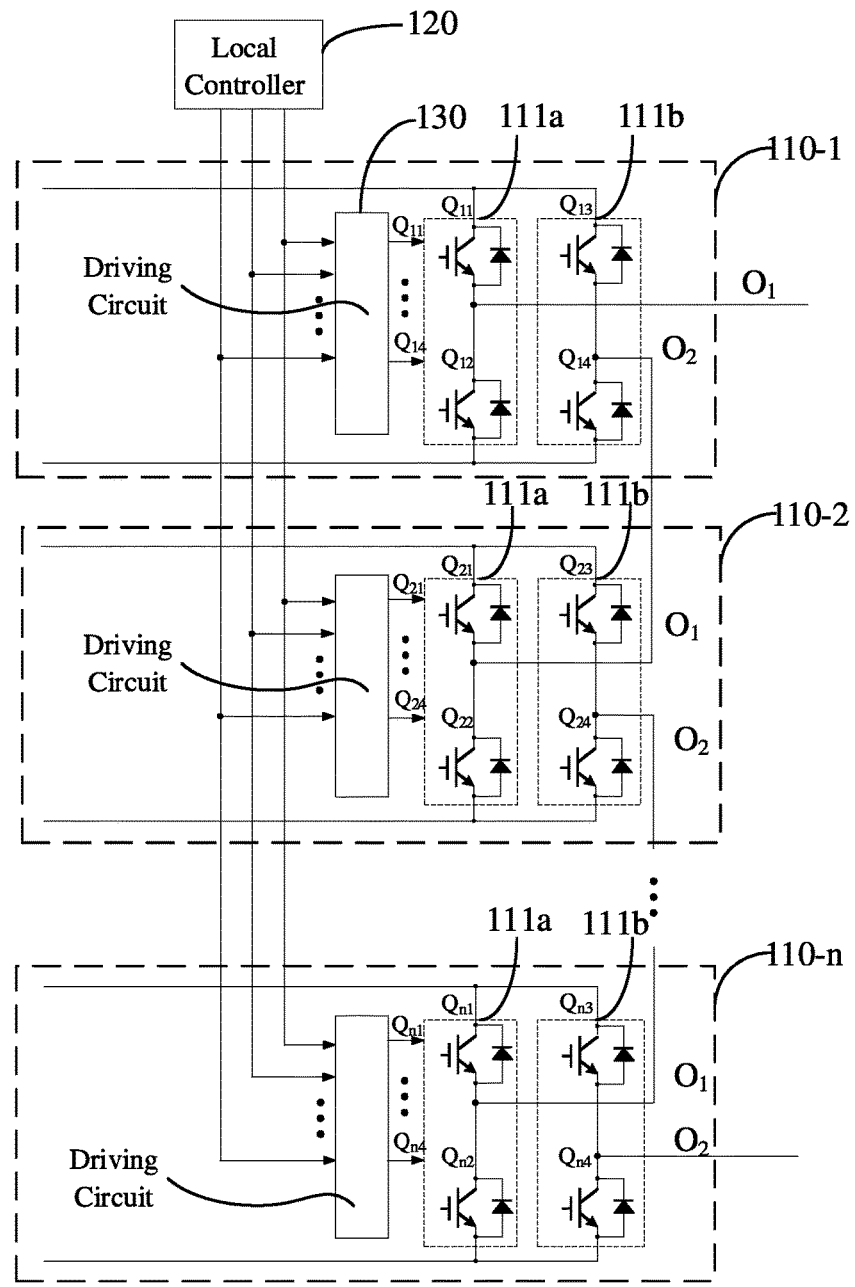
FIG. 7 is a schematic view of a power unit 100 according to another embodiment of the present disclosure.

Referring to FIG. 7, in some embodiments, each power converter is an H-bridge circuit, and the H-bridge circuit includes at least one bridge leg including a first bridge leg and a second bridge leg, wherein the first bridge leg and the second bridge leg each includes an upper power semiconductor switch and a lower power semiconductor switch. In the present embodiment, for example, the first power converter 110-1 is an H-bridge circuit including bridge legs 111a and 111b. The bridge leg 111a includes an upper power semiconductor switch $Q_{11}$ and a lower power semiconductor switch $Q_{12}$, and the bridge leg 111b includes an upper power semiconductor switch $Q_{13}$ and a lower power semiconductor switch $Q_{14}$. In the embodiment, a connection point between the upper power semiconductor switch $Q_{11}$ and the lower power semiconductor switch $Q_{12}$ is configured to be the first output terminal $O_1$ of the H-bridge circuit 110-1, and a connection point between the upper power semiconductor switch $Q_{13}$ and the lower power semiconductor switch $Q_{14}$ is configured to be the second output terminal $O_2$ of the H-bridge circuit 110-1.

In the present embodiment, the local controller 120 outputs four control signals, and each H-bridge circuit may need one driving circuit 130. The driving circuit 130 is coupled to the local controller 120 and connected to the control terminals of the upper power semiconductor switches $Q_{11}$ and $Q_{13}$ and the lower power semiconductor switches $Q_{12}$ and $Q_{14}$. The driving circuit 130 is configured to receive the four control signals outputted by the local controller 120 and process the control signals to generate four driving signals. The four driving signals are output to the control terminals of the upper power semiconductor switches $Q_{11}$ and $Q_{13}$ and the lower power semiconductor switches $Q_{12}$ and $Q_{14}$ in the H-bridge circuit, to drive the upper power semiconductor switches $Q_{11}$ and $Q_{13}$ and the lower power semiconductor switches $Q_{12}$ and $Q_{14}$ to be turned on and off. The driving circuit 130 may be electrically connected to the local controller 120 directly, or may be connected through a magnetic isolation device such as a transformer, or may be connected through an optical isolation device such as a photo coupler or optical fiber.

In the present embodiment, the local controller 120 outputs four control signals, and each H-bridge circuit may need four driving circuits. The driving circuits are coupled to the local controller 120 and are connected to the control terminals of the power semiconductor switches in the H-bridge circuit respectively. In other words, the number of the driving circuits is equal to the number of the power semiconductor switches, and each of the driving circuits is configured to receive a control signal and process the control signal to generate one driving signal. Each driving signal is output to the control terminal of the corresponding power semiconductor switch to drive the power semiconductor switch to be turned on and off.

In the present embodiment, the control signals corresponding to the power semiconductor switches in the same position of each H-bridge circuit are the same. For example, taking the upper power semiconductor switches in the bridge leg 111a in the H-bridge circuits as an example, in particular the upper power semiconductor switch $Q_{11}$ in the bridge leg 111a of the first H-bridge circuit, the upper power semiconductor switch $Q_{21}$ in the bridge leg 111a of the second H-bridge circuit, . . . , and the upper power semiconductor switch $Q_{n1}$ in the bridge leg 111a of the n-th H-bridge circuit may need a same control signal, such that the upper power semiconductor switches $Q_{11}$, $Q_{21}$, . . . , and $Q_{n1}$ are simultaneously turned on and off.

Figure 8:
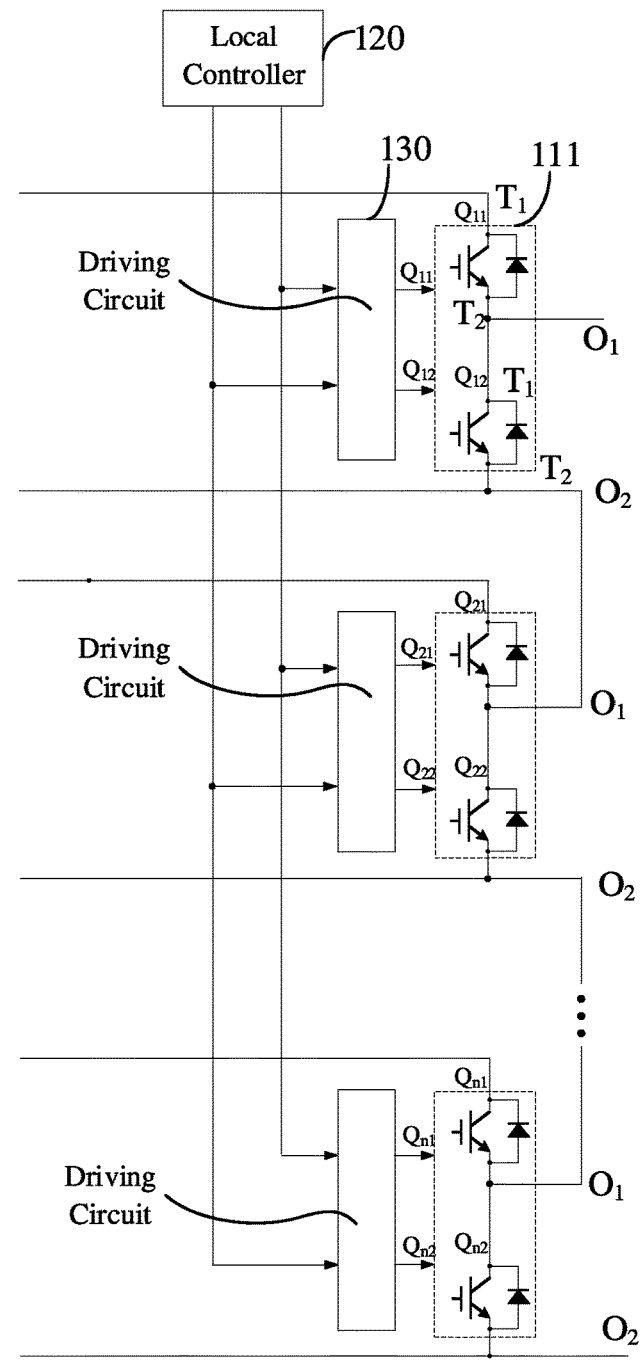
FIG. 8 is a schematic view of a power unit according to another embodiment of the present disclosure.

Referring to FIG. 8, in some embodiments, each of the power converter is a half bridge circuit including a bridge leg 111, wherein the bridge leg 111 includes an upper power semiconductor switch (e.g., $Q_{11}$) and a lower power semiconductor switch (e.g., $Q_{12}$) having a first terminal and a second terminal, the second terminal of the upper power semiconductor switch is connected to the first terminal of the lower power semiconductor switch at a connection point, the connection point is configured to be the first output terminal $O_1$ of the half bridge circuit, and the second terminal of the lower power semiconductor switch is configured to be the second output terminal $O_2$ of the half bridge circuit. In the present embodiment, the first output terminal of one of two adjacent power converters is connected successively to the second output terminal of the other one of the two adjacent power converters. In particular, the first output terminal $O_1$ of the first half bridge circuit is configured to be the first terminal of the power unit, the second output terminal $O_2$ of the first half bridge circuit is connected to the first output terminal $O_1$ of the second half bridge circuit, . . . , the second output terminal $O_2$ of the (n−1)-th half bridge circuit is connected to the first output terminal $O_1$ of the n-th half bridge circuit, and the second output terminal $O_2$ of the n-th half bridge circuit is configured to the be second terminal of the power unit.

In the present embodiment, the local controller 120 outputs two control signals (not illustrated), each control signal is configured to control one of the upper power semiconductor switch and the lower power semiconductor switch of the corresponding bridge leg, and each half bridge circuit may need one driving circuit 130. The driving circuit 130 is coupled to the local controller 120, and is connected to the control terminals of the upper power semiconductor switch $Q_{11}$ and the lower power semiconductor switch $Q_{12}$. The driving circuit 130 is configured to receive the two control signals outputted by the local controller 120 and process the control signals to generate two driving signals. The driving signals are output to the control terminals of the upper power semiconductor switch $Q_{11}$ and the lower power semiconductor switch $Q_{12}$ of the half bridge circuit, to control the upper power semiconductor switch $Q_{11}$ and the lower power semiconductor switch $Q_{12}$ to be turned on and off.

In the present embodiment, the control signals corresponding to the power semiconductor switches in the same position of each half bridge circuit are the same. For example, taking the upper power semiconductor switches in the half bridge circuits as an example, the upper power semiconductor switch $Q_{11}$ in the first half bridge circuit, the upper power semiconductor switch $Q_{21}$ in the second half bridge circuit, . . . , and the upper power semiconductor switch $Q_{11}$ in the n-th half bridge circuit may need a same control signal, such that the upper power semiconductor switches $Q_{11}, Q_{21}, \ldots,$ till $Q_{n1}$ are simultaneously turned on and off.

Figure 9:
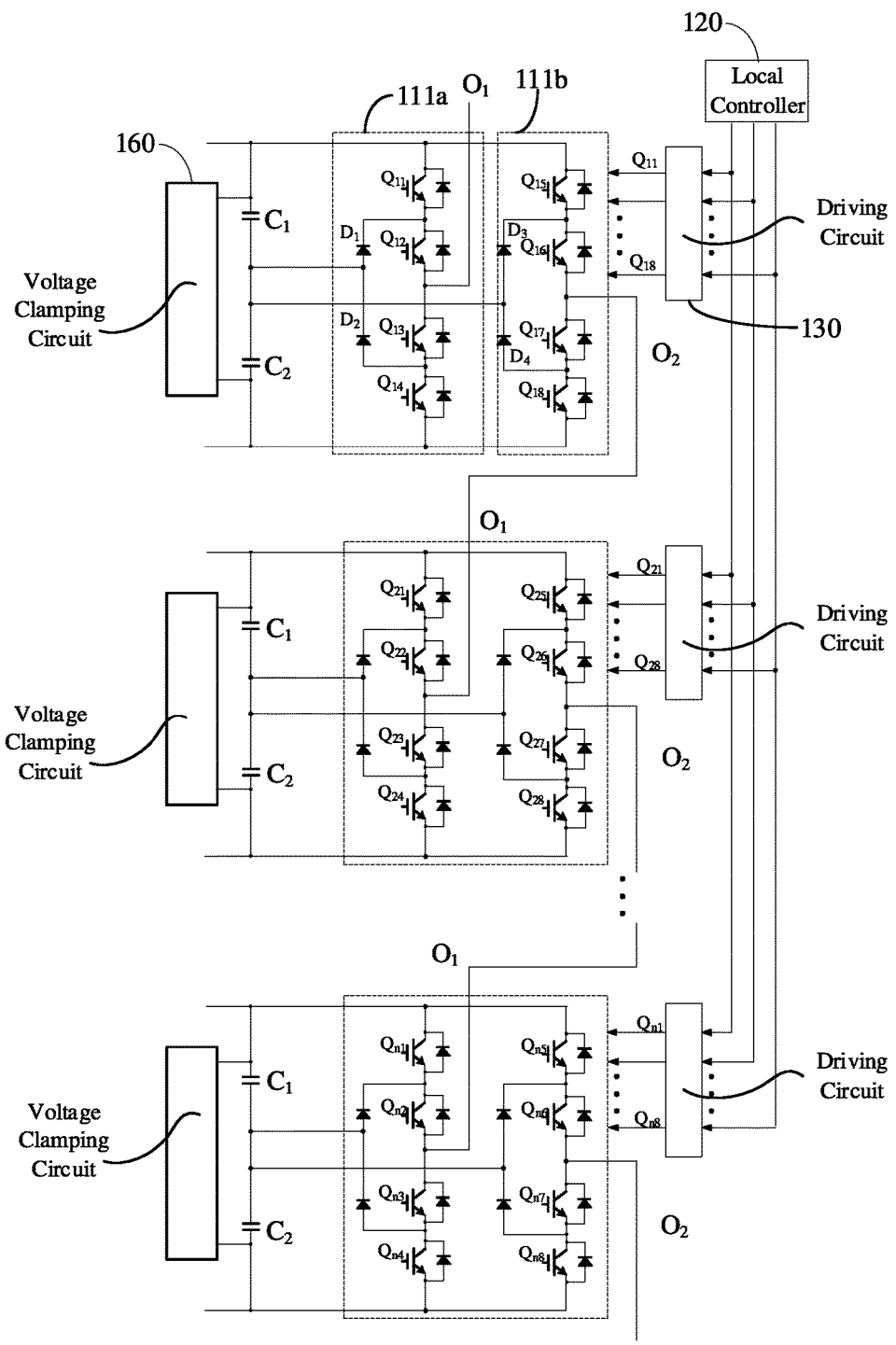
FIG. 9 is a schematic view of a power unit according to another embodiment of the present disclosure.

Referring to FIG. 9, in some embodiments, the power converter is a diode clamping three-level circuit, and the diode clamping three-level circuit includes at least one bridge leg including a first bridge leg 111a and a second bridge leg 111b. Each of the first bridge leg 111a and the second bridge leg 111b includes a first power semiconductor switch (e.g., $Q_{11}$ and $Q_{15}$), a second power semiconductor switch (e.g., $Q_{12}$ and $Q_{16}$), a third power semiconductor switch (e.g., $Q_{13}$ and $Q_{17}$) and a fourth power semiconductor switch (e.g., $Q_{14}$ and $Q_{18}$). The diode clamping three-level circuit further includes a first bus capacitor $C_1$, a second bus capacitor $C_2$, a first switch $D_1$, a second switch $D_2$, a third switch $D_3$ and a fourth switch $D_4$. In one embodiment, the first and second bus capacitors $C_1$ and $C_2$ are connected in series and then connected in parallel with the first and second bridge legs 111a and 111b. The first power semiconductor switch $Q_{11}$, the second power semiconductor switch $Q_{12}$, the third power semiconductor switch $Q_{13}$ and the fourth power semiconductor switch $Q_{14}$ of the first bridge leg 111a are connected in series. A connection point between the second power semiconductor switch $Q_{12}$ and the third power semiconductor switch $Q_{13}$ is configured to be the first output terminal $O_1$. The first power semiconductor switch $Q_{15}$, the second power semiconductor switch $Q_{16}$, the third power semiconductor switch $Q_{17}$ and the fourth power semiconductor switch $Q_{18}$ of the second bridge leg 111b are connected in series. A connection point between the second power semiconductor switch $Q_{16}$ and the third power semiconductor switch $Q_{17}$ is configured to be the second output terminal $O_2$. The first and second switches $D_1$ and $D_2$, are connected in series and then connected between a connection point between the first power semiconductor switch $Q_{11}$ and the second power semiconductor switch $Q_{12}$ of the first bridge leg 111a and a connection point between the third power semiconductor switch $Q_{13}$ and the fourth power semiconductor switch $Q_{14}$. The third and fourth switches $D_3$ and $D_4$ are connected in series and then connected between a connection point between the first power semiconductor switch $Q_{15}$ and the second power semiconductor switch $Q_{16}$ of the second bridge leg 111b and a connection point between the third power semiconductor switch $Q_{17}$ and the fourth power semiconductor switch $Q_{18}$. A connection point between the first switch $D_1$ and the second switch $D_2$ is connected to a connection point between the first bus capacitor $C_1$ and the second bus capacitor $C_2$. A connection point between the third switch $D_3$ and the fourth switch $D_4$ is connected to the connection point between the first bus capacitor $C_1$ and the second bus capacitor $C_2$. In the present embodiment, the first switch $D_1$ and the second switch $D_2$ are clamping diodes, and the first power semiconductor switch, the second power semiconductor switch, the third power semiconductor switch, and the fourth power semiconductor switch are IGBTs OR IGCTs (Integrated Gate Commutated Thyristor) or the like.

In the present embodiment, the first output terminal of one of two adjacent power converters is connected successively to the second output terminal of the other one of the two adjacent power converters. In particular, the first output terminal $O_1$ of the first diode clamping three-level circuit is configured to be the first terminal of the power unit, the second output terminal $O_2$ of the first diode clamping three-level circuit is connected to the first output terminal $O_1$ of the second diode clamping three-level circuit, . . . , the second output terminal $O_2$ of the (n–1)-th diode clamping three-level circuit is connected to the first output terminal $O_1$ of the n-th diode clamping three-level circuit, and the second output terminal $O_2$ of the n-th diode clamping three-level circuit is configured to the be second terminal of the power unit.

In the present embodiment, the local controller outputs eight control signals, each control signal is configured to control a corresponding one of the first power semiconductor switch (e.g., $Q_{11}$ and $Q_{15}$), the second power semiconductor switch (e.g., $Q_{12}$ and $Q_{16}$), the third power semiconductor switch (e.g., $Q_{13}$ and $Q_{17}$), and the fourth power semiconductor switch (e.g., $Q_{14}$ and $Q_{18}$). The control signals corresponding to the power semiconductor switches in the same position of each diode clamping three-level circuit are the same. For example, taking the first power semiconductor switches in the diode clamping three-level circuits as an example, the first power semiconductor switch $Q_{11}$ in the first diode clamping three-level circuit, the first power semiconductor switch $Q_{21}$ in the second diode clamping three-level circuit, . . . , and the first power semiconductor switch $Q_{n1}$ in the n-th diode clamping three-level circuit may need a same control signal, such that the first power semiconductor switches $Q_{11}, Q_{21}, \ldots,$ and $Q_{n1}$ are simultaneously turned on and off.

Figure 10:
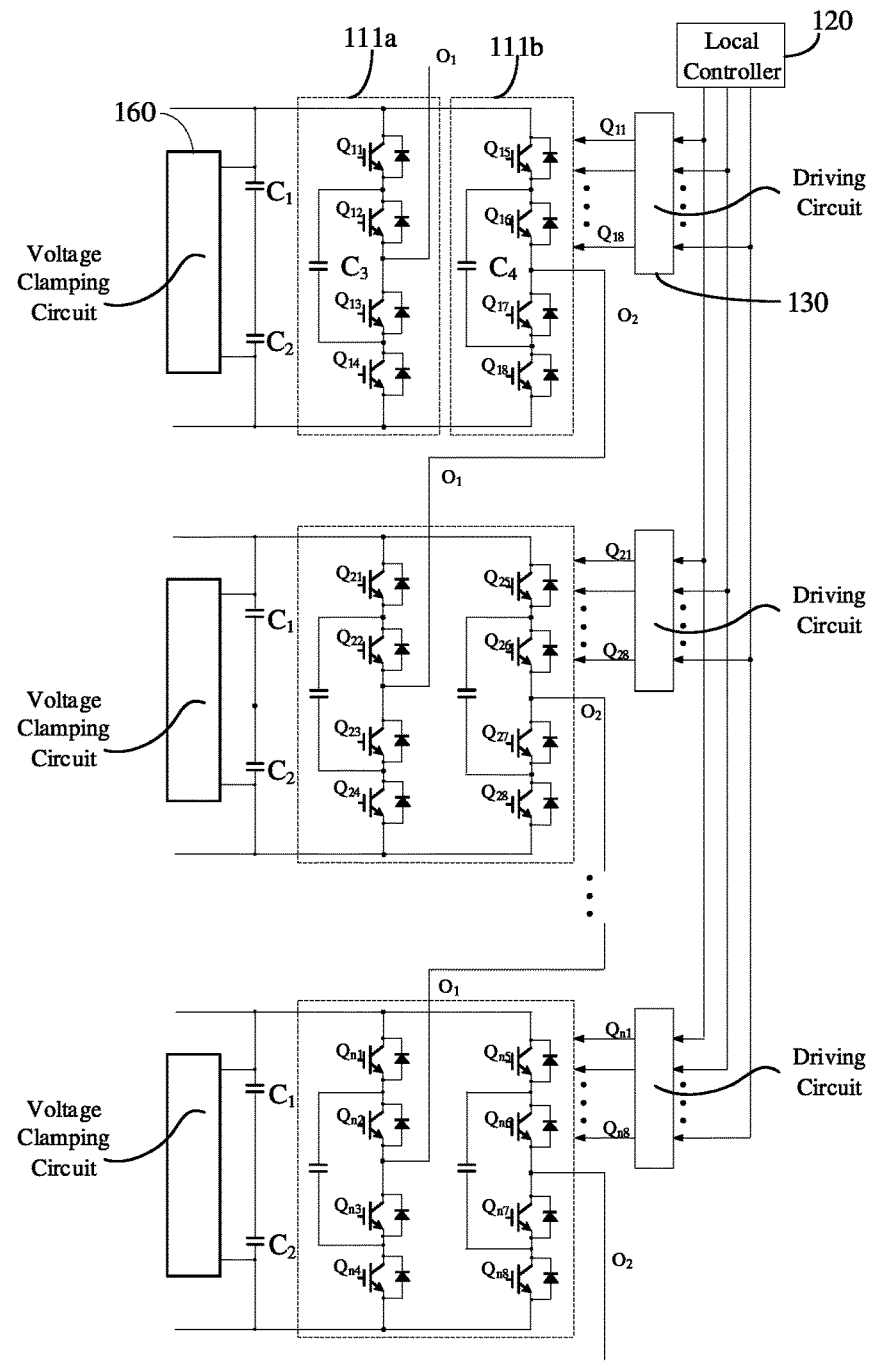
FIG. 10 is a schematic view of a power unit according to another embodiment of the present disclosure.

Referring to FIG. 10, in some embodiments, the power converter 110 is a flying capacitor three-level circuit. The flying capacitor three-level circuit includes at least one bridge leg including a first bridge leg 111a and a second bridge leg 111b. Each of the first bridge leg 111a and the second bridge leg 111b includes a first power semiconductor switch (e.g., $Q_{11}$ and $Q_{15}$), a second power semiconductor switch (e.g., $Q_{12}$ and $Q_{16}$), a third power semiconductor switch (e.g., $Q_{13}$ and $Q_{17}$) and a fourth power semiconductor switch (e.g., $Q_{14}$ and $Q_{18}$). The flying capacitor three-level circuit further includes a first bus capacitor $C_1$, a second bus capacitor $C_2$, a first capacitor $C_3$ and a second capacitor $C_4$. In one embodiment, the first and second bus capacitors $C_1$ and $C_2$ are connected in series and then connected in parallel with the first and second bridge legs 111a and 111b. The first power semiconductor switch $Q_{11}$, the second power semiconductor switch $Q_{12}$, the third power semiconductor switch $Q_{13}$ and the fourth power semiconductor switch $Q_{14}$ of the first bridge leg 111a are connected in series. A connection point between the second power semiconductor switch $Q_{12}$ and the third power semiconductor switch $Q_{13}$ is configured to be the first output terminal $O_1$. The first power semiconductor switch $Q_{15}$, the second power semiconductor switch $Q_{16}$, the third power semiconductor switch $Q_{17}$ and the fourth power semiconductor switch $Q_{18}$ of the second bridge leg 111b are connected in series. A connection point between the second power semiconductor switch $Q_{16}$ and the third power semiconductor switch $Q_{17}$ is configured to be the second output terminal $O_2$. The first capacitor $C_3$ is connected between a connection point between the first power semiconductor switch $Q_{11}$ and the second power semiconductor switch $Q_{12}$ of the first bridge leg 111a and a connection point between the third power semiconductor switch $Q_{13}$ and the fourth power semiconductor switch $Q_{14}$ of the first bridge leg 111a. The second capacitor $C_4$ is connected between a connection point between the first power semiconductor switch $Q_{15}$ and the second power semiconductor switch $Q_{16}$ of the second bridge leg 111b and a connection point between the third power semiconductor switch $Q_{17}$ and the fourth power semiconductor switch $Q_{18}$ of the second bridge leg 111b.

In the present embodiment, the first output terminal of one of two adjacent power converters is connected successively to the second output terminal of the other one of the two adjacent power converters. In particular, the first output terminal $O_1$ of the first flying capacitor three-level circuit is configured to be the first terminal of the power unit, the second output terminal $O_2$ of the first flying capacitor three-level circuit is connected to the first output terminal $O_1$ of the second flying capacitor three-level circuit, . . . , the second output terminal $O_2$ of the (n–1)-th flying capacitor three-level circuit is connected to the first output terminal $O_1$ of the n-th flying capacitor three-level circuit, and the second output terminal $O_2$ of the n-th flying capacitor three-level circuit is configured to the be second terminal of the power unit.

In the present embodiment, the local controller outputs eight control signals, each control signal is configured to control a corresponding one of the first power semiconductor switch (e.g., $Q_{11}$ and $Q_{15}$), the second power semiconductor switch (e.g., $Q_{12}$ and $Q_{16}$), the third power semiconductor switch (e.g., $Q_{13}$ and $Q_{17}$), and the fourth power semiconductor switch (e.g., $Q_{14}$ and $Q_{18}$). The control signals corresponding to the power semiconductor switches in the same position of each flying capacitor three-level circuit are the same. For example, taking the first power semiconductor switches in the flying capacitor three-level circuits as an example, the first power semiconductor switch $Q_{11}$ in the first flying capacitor three-level circuit, the first power semiconductor switch $Q_{21}$ in the second flying capacitor three-level circuit, . . . , and the first power semiconductor switch $Q_{n1}$ in the n-th flying capacitor three-level circuit may need a same control signal, such that the first power semiconductor switches $Q_{11}$, $Q_{21}$, . . . , till $Q_{n1}$ are simultaneously turned on and off.

Figure 11:
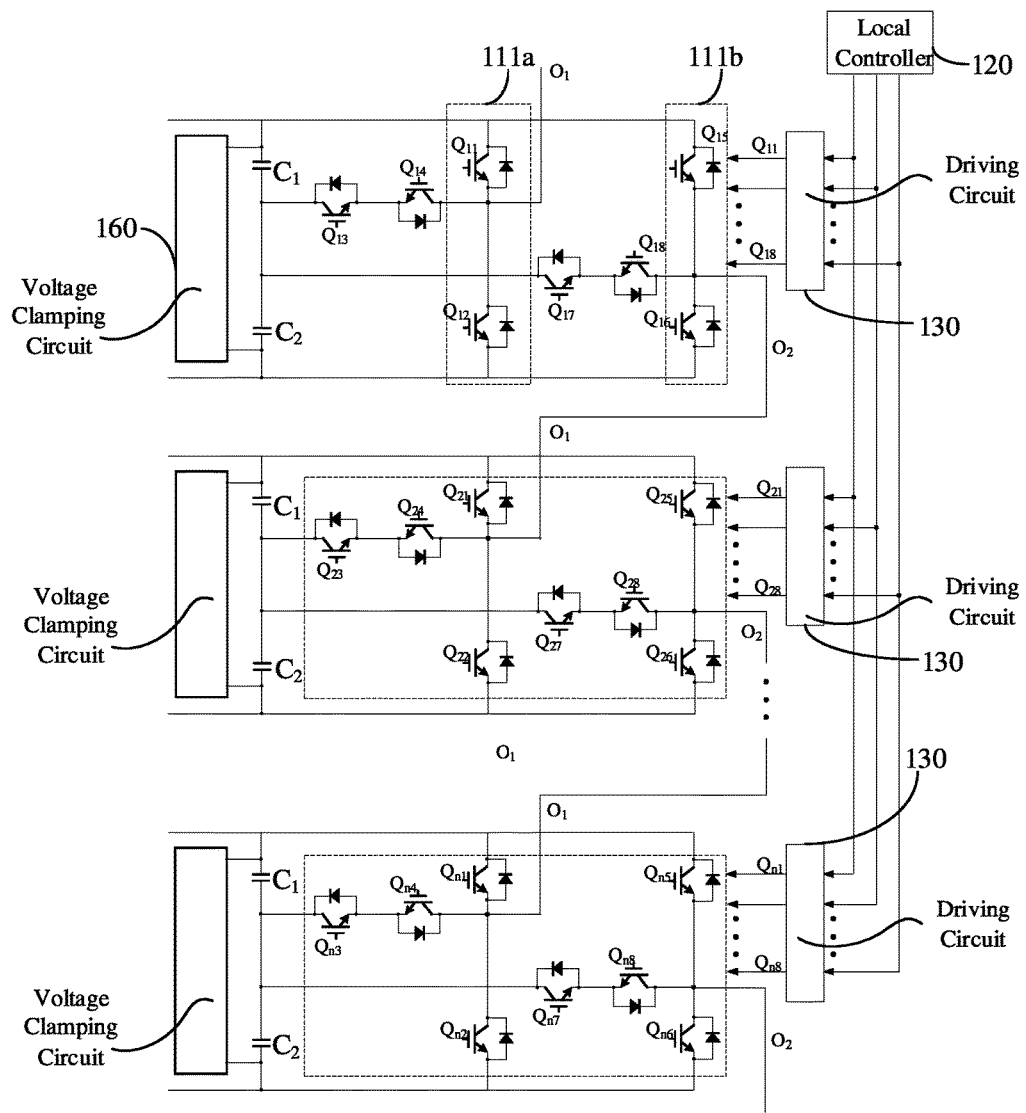
FIG. 11 is a schematic view of a power unit according to another embodiment of the present disclosure.

Referring to FIG. 11, in some embodiments, the power converter 110 is a neutral point controllable three-level circuit. The neutral point controllable three-level circuit includes at least one bridge leg including a first bridge leg 111a and a second bridge leg 111b. Each of the first bridge leg 111a and the second bridge leg 111b includes an upper power semiconductor switch (e.g., $Q_{11}$ and $Q_{15}$) and a lower power semiconductor switch (e.g., $Q_{12}$ and $Q_{16}$). The neutral point controllable three-level circuit further includes a first bus capacitor $C_1$, a second bus capacitor $C_2$, a first switch set (e.g., $Q_{13}$ and $Q_{14}$) and a second switch set (e.g., $Q_{17}$ and $Q_{18}$). In one embodiment, the first and second bus capacitors $C_1$ and $C_2$ are connected in series and then connected in parallel with the first and second bridge legs 111a and 111b. A connection point between the upper power semiconductor switch $Q_{11}$ and the lower power semiconductor switch $Q_{12}$ of the first bridge leg 111a is configured to be the first output terminal $O_1$. A connection point between the upper power semiconductor switch $Q_{15}$ and the lower power semiconductor switch $Q_{16}$ of the second bridge leg 111b is configured to be the second output terminal $O_2$. The first switch set (e.g., $Q_{13}$ and $Q_{14}$) is connected between a connection point between the upper power semiconductor switch $Q_{11}$ and the lower power semiconductor switch $Q_{12}$ of the first bridge leg 111a and a connection point between the first bus capacitor $C_1$ and the second bus capacitor $C_2$. The second switch set (e.g., $Q_{17}$ and $Q_{18}$) is connected between a connection point between the upper power semiconductor switch $Q_{15}$ and the lower power semiconductor switch $Q_{16}$ of the second bridge leg 111b and the connection point between the first bus capacitor $C_1$ and the second bus capacitor $C_2$. In the present embodiment, the first switch set is formed by two power semiconductor switches connected in series, and said two power semiconductor switches are bidirectional controllable switches.

In the present embodiment, the first output terminal of one of two adjacent power converters is connected successively to the second output terminal of the other one of the two adjacent power converters. In particular, the first output terminal $O_1$ of the first neutral point controllable three-level circuit is configured to be the first terminal of the power unit, the second output terminal $O_2$ of the first neutral point controllable three-level circuit is connected to the first output terminal $O_1$ of the second neutral point controllable three-level circuit, . . . , the second output terminal $O_2$ of the (n–1)-th neutral point controllable three-level circuit is connected to the first output terminal $O_1$ of the n-th neutral point controllable three-level circuit, and the second output terminal $O_2$ of the n-th neutral point controllable three-level circuit is configured to the be second terminal of the power unit.

In the present embodiment, the local controller outputs eight control signals, each control signal is configured to control a corresponding one of the upper power semiconductor switch (e.g., $Q_{11}$ and $Q_{15}$), the lower power semiconductor switch (e.g., $Q_{12}$ and $Q_{16}$), the first switch set (e.g., $Q_{13}$ and $Q_{14}$), and the second switch set (e.g., $Q_{17}$ and $Q_{18}$). The control signals corresponding to the power semiconductor switches in the same position of each neutral point controllable three-level circuit are the same. For example, taking the upper power semiconductor switches in the neutral point controllable three-level circuits as an example, the upper power semiconductor switch $Q_{11}$ in the first neutral point controllable three-level circuit, the upper power semiconductor switch $Q_{21}$ in the second neutral point controllable three-level circuit, . . . , and the upper power semiconductor switch $Q_{n1}$ in the n-th neutral point controllable three-level circuit may need a same control signal, such that the upper power semiconductor switches $Q_{11}$, $Q_{21}$, . . . , till $Q_{n1}$ are simultaneously turned on and off.

Figure 12:
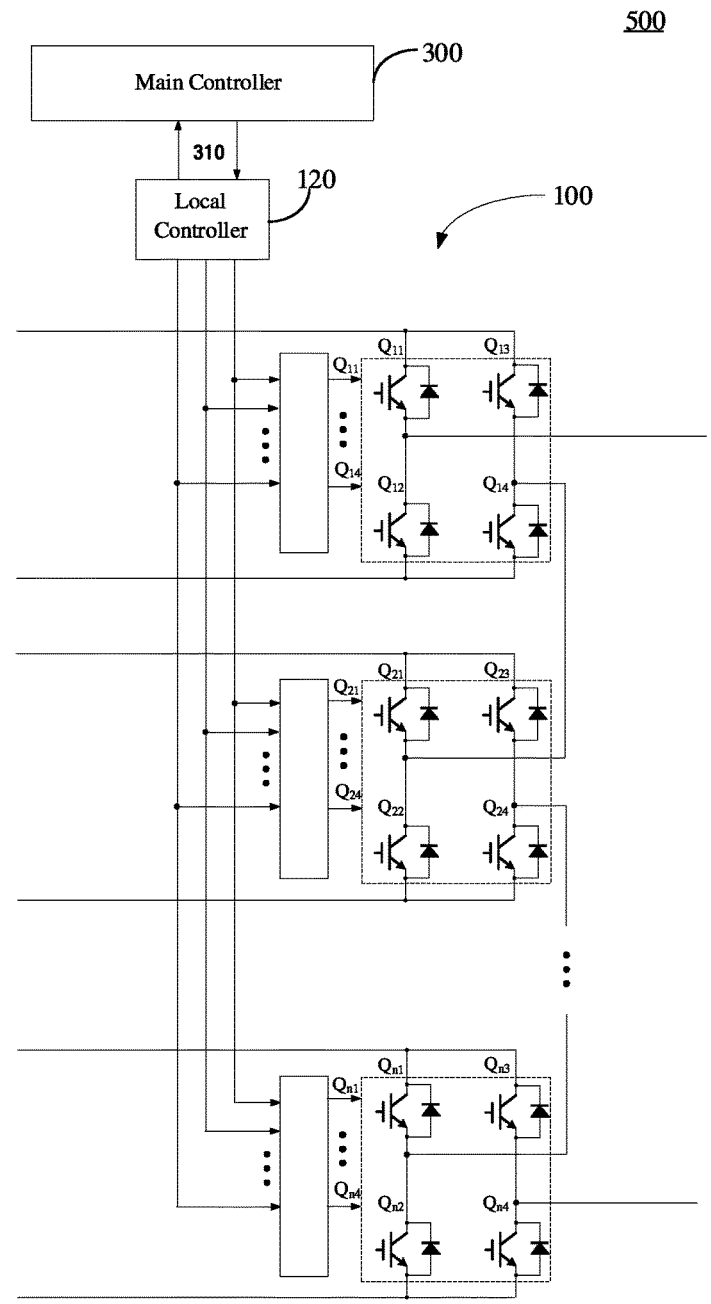
FIG. 12 is a power electronic conversion device according to the present disclosure.

Referring to FIG. 12, the present disclosure further provides a power electronic conversion device 500 which may include: a main controller 300 configured to output a main control signal; and at least one power unit 100 according to embodiments of the present disclosure.

The local controller 120 is coupled to the main controller 300 to receive the main control signal and correspondingly generate the control signals.

In some embodiments, the at least one power unit 100 includes a plurality of power units, wherein the second terminal of one of two adjacent power units 100 is connected to the first terminal of the other one of two adjacent power units 100, and the local controller 120 of each power unit 100 is coupled to the main controller 300.

In some embodiments, the local controller 120 is connected to the main controller 300 through an optical fiber 310, or the local controller 120 is directly electrically connected to the main controller 300.

In the first scheme in FIG. 1 and FIG. 2, each power unit 100 includes only one power converter 110, and each power unit 100 corresponds to a set of the optical fiber, the auxiliary power source 150 and the control panel. In addition, there are many power converters. Accordingly, in comparison to the first scheme in the FIG. 1 and FIG. 2, the power unit 100 according to embodiments of the present disclosure includes a plurality of power converters 110 and thus may share and withstand higher voltage. Accordingly, the number of the power unit 100 may be reduced and thereby reducing the number of the optical fiber, the auxiliary power source 150 and the local controller 120, simplifying the circuit structure and improving system reliability.

In the second scheme in FIG. 1 and FIG. 2, a high voltage power device is used to reduce the number of cascaded power unit 100, while the cost of the high voltage power device is relatively high. According to the power unit 100 of the embodiments of the present disclosure, the number of the power unit 100 may also be reduced by using a low voltage power device, and the present disclosure may reduce cost in comparison to the second scheme in the FIG. 1 and FIG. 2.

In the third scheme in FIG. 1 and FIG. 2, a plurality of same power semiconductor switches are connected in series to be equivalent to a high voltage power device, and a voltage clamping circuit is provided for each power semiconductor switch to prevent voltage nonuniformity. While in the power unit 100 according to the embodiments of the present disclosure, a voltage clamping circuit is required only for each power converter 110, thereby reducing the number of the voltage clamping circuits, reducing cost and improving system reliability.

Exemplary embodiments of the present disclosure have been particularly illustrated and described above. It should be appreciated that the present disclosure is not limited to the detailed structures, configurations or implementations, rather, the present disclosure is intended to include various modifications and equivalents within the spirit and scope of the appended claims.

What is claimed is:

1. A power unit comprising:
   a plurality of power converters, each power converter comprising at least one bridge leg having a plurality of power semiconductor switches, and each power converter comprising a first output terminal and a second output terminal, wherein the first output terminal of one of two adjacent power converters among the plurality of power converters is connected successively to the second output terminal of the other one of the two adjacent power converters, and the residual first output terminal and the second output terminal are configured as a first terminal and a second terminal of the power unit;
   a local controller configured to output a plurality of control signals; and
   a plurality of driving circuits coupled to the local controller and each driving circuit of the plurality of driving circuit being configured to receive the plurality of control signals and output respective driving signals according to the plurality of control signals, to drive the plurality of power semiconductor switches to be turned on and off,
   wherein the plurality of power converters are the same, a number of the plurality of control signals is the same as a number of the power semiconductor switches in each power converter, and the plurality of control signals corresponding to the power semiconductor switches in the same position of the plurality of power converters are the same, such that the power semiconductor switches in the same position of the plurality of power converters are simultaneously turned on and off.

2. The power unit according to claim 1, further comprising:
   an auxiliary power supply connected to the local controller and configured to provide power for the local controller.

3. The power unit according to claim 1, wherein a number of the plurality of driving circuits is the same as that of the power semiconductor switches, and each driving circuit drives a corresponding power semiconductor switch to be turned on and off.

4. The power unit according to claim 1, wherein the plurality of driving circuits are directly connected to the local controller, or the plurality of driving circuits are connected to the local controller through a magnetic isolation device, or the plurality of driving circuits are connected to the local controller through an optical isolation device.

5. The power unit according to claim 1, wherein the power converter comprises:
   a bus capacitor and a voltage clamping circuit, both ends of the bus capacitor being connected in parallel to both ends of the at least one bridge leg, and the voltage clamping circuit being connected in parallel to both ends of the bus capacitor.

6. The power unit according to claim 5, wherein a bus voltage across both ends of the bus capacitor is clamped by the voltage clamping circuit within a predetermined range.

7. The power unit according to claim 1, wherein a number of the plurality of power converters is "n", the first output terminal of the first power converter is configured to be the first terminal of the power unit, the second output terminal of the first power converter is connected to the first output terminal of the second power converter, other power converters are connected successively till the (n−1)-th power converter, the second output terminal of the (n−1)-th power converter is connected to the first output terminal of the n-th power converter, and the second output terminal of the n-th power converter is configured to be the second terminal of the power unit, wherein n is a natural number greater than 1.

8. The power unit according to claim 7, wherein the power converter is an H-bridge circuit comprising:
   the at least one bridge leg comprising a first bridge leg and a second bridge leg, wherein the first bridge leg and the second bridge leg each comprises an upper power semiconductor switch of the plurality of power semiconductor switches and a lower power semiconductor switch of the plurality of power semiconductor switches, a connection point between the upper power semiconductor switch and the lower power semiconductor switch of the first bridge leg is configured to be the first output terminal of the power converter, and a connection point between the upper power semiconductor switch and the lower power semiconductor switch of the second bridge leg is configured to be the second output terminal of the power converter.

9. The power unit according to claim 7, wherein the power converter is a half bridge circuit comprising a bridge leg of the at least one bridge leg, wherein the bridge leg comprises an upper power semiconductor switch of the plurality of power semiconductor switches and a lower power semiconductor switch of the plurality of power semiconductor switches having a first terminal and a second terminal, the second terminal of the upper power semiconductor switch is connected to the first terminal of the lower power semiconductor switch at a connection point, the connection point is configured to be the first output terminal of the power converter, and the second terminal of the lower power semiconductor switch is configured to be the second output terminal of the power converter.

10. The power unit according to claim 7, wherein the power converter is a diode clamping three-level circuit comprising:
   the at least one bridge leg comprising a first bridge leg and a second bridge leg, the first bridge leg and the second bridge leg each comprising a respective first power semiconductor switch of the plurality of power semiconductor switches, a second power semiconductor switch of the plurality of power semiconductor switches, a third power semiconductor switch of the plurality of power semiconductor switches and a fourth power semiconductor switch of the plurality of power semiconductor switches, wherein the first power semiconductor switch, the second power semiconductor switch, the third power semiconductor switch and the fourth power semiconductor switch of the first bridge leg are connected in series, and a connection point between the second power semiconductor switch and the third power semiconductor switch of the first bridge leg is configured to be the first output terminal of the power converter, and wherein the first power semiconductor switch, the second power semiconductor switch, the third power semiconductor switch and the fourth power semiconductor switch of the second bridge leg are connected in series, and a connection point between the second power semiconductor switch and the third power semiconductor switch of the second bridge leg is configured to be the second output terminal of the power converter;

a first bus capacitor and a second bus capacitor, wherein the first and second bus capacitors are connected in series and then connected in parallel with the first and second bridge legs; and a first switch, a second switch, a third switch and a fourth switch, wherein the first and second switches are connected in series and then connected between a connection point between the first power semiconductor switch and the second power semiconductor switch of the first bridge leg and a connection point between the third power semiconductor switch and the fourth power semiconductor switch of the first bridge leg, and wherein the third and fourth switches are connected in series and then connected between a connection point between the first power semiconductor switch and the second power semiconductor switch of the second bridge leg and a connection point between the third power semiconductor switch and the fourth power semiconductor switch of the second bridge leg, wherein a connection point between the first switch and the second switch is connected to a connection point between the first bus capacitor and the second bus capacitor, and a connection point between the third switch and the fourth switch is connected to the connection point between the first bus capacitor and the second bus capacitor.

11. The power unit according to claim 7, wherein the power converter is a flying capacitor three-level circuit comprising:

the at least one bridge leg comprising a first bridge leg and a second bridge leg, the first bridge leg and the second bridge leg each comprising a respective first power semiconductor switch of the plurality of power semiconductor switches, a second power semiconductor switch of the plurality of power semiconductor switches, a third power semiconductor switch of the plurality of power semiconductor switches and a fourth power semiconductor switch of the plurality of power semiconductor switches, wherein the first power semiconductor switch, the second power semiconductor switch, the third power semiconductor switch and the fourth power semiconductor switch of the first bridge leg are connected in series, and a connection point between the second power semiconductor switch and the third power semiconductor switch of the first bridge leg is configured to be the first output terminal of the power converter, and wherein the first power semiconductor switch, the second power semiconductor switch, the third power semiconductor switch and the fourth power semiconductor switch of the second bridge leg are connected in series, and a connection point between the second power semiconductor switch and the third power semiconductor switch of the second bridge leg is configured to be the second output terminal of the power converter;

a first bus capacitor and a second bus capacitor, wherein the first and second bus capacitors are connected in series and then connected in parallel with the first and second bridge legs; and a first capacitor and a second capacitor, wherein the first capacitor is connected between a connection point between the first power semiconductor switch and the second power semiconductor switch of the first bridge leg and a connection point between the third power semiconductor switch and the fourth power semiconductor switch of the first bridge leg, and wherein the second capacitor is connected between a connection point between the first power semiconductor switch and the second power semiconductor switch of the second bridge leg and a connection point between the third power semiconductor switch and the fourth power semiconductor switch of the second bridge leg.

12. The power unit according to claim 7, wherein the power converter is a neutral point controllable three-level circuit comprising:

the at least one bridge leg comprising a first bridge leg and a second bridge leg, the first bridge leg and the second bridge leg each comprising a respective upper power semiconductor switch of the plurality of power semiconductor switches and a lower power semiconductor switch of the plurality of power semiconductor switches, wherein a connection point between the upper power semiconductor switch and the lower power semiconductor switch of the first bridge leg is configured to be the first output terminal of the power converter, and a connection point between the upper power semiconductor switch and the lower power semiconductor switch of the second bridge leg is configured to be the second output terminal of the power converter;

a first bus capacitor and a second bus capacitor, wherein the first and second bus capacitors are connected in series and then connected in parallel with the first and second bridge legs; and a first switch set and a second switch set, wherein the first switch set is connected between the connection point between the upper power semiconductor switch and the lower power semiconductor switch of the first bridge leg and a connection point between the first bus capacitor and the second bus capacitor, and the second switch set is connected between the connection point between the upper power semiconductor switch and the lower power semiconductor switch of the second bridge leg and the connection point between the first bus capacitor and the second bus capacitor.

13. A power electronic conversion device comprising:
a main controller, configured to output a main control signal; and
at least one power unit according to claim 1, wherein the local controller is coupled to the main controller to receive the main control signal and correspondingly generate the plurality of control signals.

14. The power electronic conversion device according to claim 13, wherein the at least one power unit comprises a plurality of power units, wherein the second terminal of one of two adjacent power units is connected to the first terminal of the a second power unit of the plurality of power units, and the local controller of each power unit is coupled to the main controller.

15. The power electronic conversion device according to claim 13, wherein the local controller is connected to the main controller through an optical fiber, or the local controller is directly electrically connected to the main controller.

* * * * *